(12) United States Patent
Russell et al.

(10) Patent No.: US 9,922,306 B1
(45) Date of Patent: *Mar. 20, 2018

(54) MOBILE RFID READING SYSTEMS

(71) Applicant: Amazon Technologies, Inc., Seattle, WA (US)

(72) Inventors: Ryan Scott Russell, Bellevue, WA (US); Thomas Matthew Ryle, Olympia, WA (US); Jonathan David Phillips, Seattle, WA (US); Justin David Kelly, Seattle, WA (US); Wesley Scott Lauka, Seattle, WA (US); William R. Hazlewood, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,395

(22) Filed: Oct. 3, 2016

Related U.S. Application Data

(63) Continuation of application No. 14/559,557, filed on Dec. 3, 2014, now Pat. No. 9,477,938.

(51) Int. Cl.
| | |
|---|---|
| *G06F 19/00* | (2011.01) |
| *G06Q 30/00* | (2012.01) |
| *G06Q 90/00* | (2006.01) |
| *G06Q 10/08* | (2012.01) |
| *G06K 7/10* | (2006.01) |
| *G06K 19/077* | (2006.01) |

(52) U.S. Cl.
CPC ....... *G06Q 10/087* (2013.01); *G06K 7/10386* (2013.01); *G06K 19/07758* (2013.01)

(58) Field of Classification Search
USPC .................................................. 235/383, 385
See application file for complete search history.

(56) References Cited

U.S. PATENT DOCUMENTS

| | | | |
|---|---|---|---|
| 7,118,036 B1 | 10/2006 | Couch et al. | |
| 7,151,979 B2 | 12/2006 | Andersen et al. | |
| 7,155,304 B1 | 12/2006 | Charych | |
| 7,916,028 B2 | 3/2011 | Oberle | |
| 8,280,547 B2 | 10/2012 | D'Andrea et al. | |
| 8,416,059 B1 | 4/2013 | Rambadt et al. | |
| 8,738,474 B1* | 5/2014 | McHugh | G06Q 10/087 235/383 |
| 2003/0171984 A1* | 9/2003 | Wodka | G06Q 20/387 705/14.25 |
| 2004/0111335 A1 | 6/2004 | Black et al. | |

(Continued)

OTHER PUBLICATIONS

U.S. Appl. No. 14/559,557, "Final Office Action", dated Nov. 13, 2015, 15 pages.

(Continued)

*Primary Examiner* — Tuyen K Vo
(74) *Attorney, Agent, or Firm* — Kilpatrick Townsend & Stockton LLP

(57) ABSTRACT

In some examples, a mobile reading device is provided. The mobile reading device may include an movement device and a reader device. The reader device may be configured to read, via one or more antennas, identifying tags associated with items. The one or more antennas may be included as part of the mobile reading device, within a holder structure, or in some other structure or device.

20 Claims, 13 Drawing Sheets

(56) References Cited

U.S. PATENT DOCUMENTS

| | | | |
|---|---|---|---|
| 2005/0012613 A1 | 1/2005 | Eckstein et al. | |
| 2005/0246248 A1 | 11/2005 | Vesuna | |
| 2006/0163350 A1* | 7/2006 | Melton | G06K 7/10336 235/435 |
| 2006/0208072 A1* | 9/2006 | Ku | G06K 7/0008 235/383 |
| 2007/0103304 A1* | 5/2007 | Newton | G06K 17/00 340/572.1 |
| 2007/0285253 A1 | 12/2007 | Sharma et al. | |
| 2008/0068173 A1* | 3/2008 | Alexis | H01Q 1/2208 340/572.7 |
| 2008/0106377 A1 | 5/2008 | Flores et al. | |
| 2008/0211671 A1* | 9/2008 | Daily | G06Q 20/18 340/572.1 |
| 2008/0308630 A1* | 12/2008 | Bhogal | G06Q 30/02 235/383 |
| 2009/0096611 A1* | 4/2009 | Jones | G06K 7/0008 340/572.7 |
| 2010/0102969 A1* | 4/2010 | Svalesen | G06K 17/0022 340/572.8 |
| 2010/0207838 A1* | 8/2010 | Chiu | H01Q 1/2216 343/873 |
| 2012/0143427 A1 | 6/2012 | Hoffman et al. | |
| 2013/0048724 A1* | 2/2013 | Burnside | G06Q 10/087 235/385 |
| 2014/0247116 A1 | 9/2014 | Davidson | |
| 2014/0304107 A1 | 10/2014 | McAllister | |
| 2015/0004679 A1* | 1/2015 | Conger | A01K 1/031 435/287.2 |

OTHER PUBLICATIONS

U.S. Appl. No. 14/559,557 , "Non-Final Office Action", dated Jul. 6, 2015, 12 pages.
U.S. Appl. No. 14/559,557 , "Non-Final Office Action", dated Mar. 2, 2016, 15 pages.
U.S. Appl. No. 14/559,557 , "Notice of Allowance", dated Jul. 6, 2016, 9 pages.

* cited by examiner

MOBILE RFID READING SYSTEMS

CROSS REFERENCE TO RELATED APPLICATIONS

This application is a continuation of U.S. patent application Ser. No. 14/559,557, filed on Dec. 3, 2014, titled "MOBILE RFID READING SYSTEMS", issued as U.S. Pat. No. 9,477,938 on Oct. 25, 2016, the contents of which are herein incorporated in their entirety.

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, as modern inventory systems continue to increase in size and complexity, the likelihood that some inventory items will become lost within the inventory systems increases. These items may be lost as they are transferred into the inventory systems, as they move throughout the inventory systems, or as they move out of the inventory systems. Lost inventory items may impact operating budgets associated with these inventory systems and may also affect the efficiency of these systems.

BRIEF DESCRIPTION OF THE DRAWINGS

Various embodiments in accordance with the present disclosure will be described with reference to the drawings, in which.

DETAILED DESCRIPTION

Figure 1:
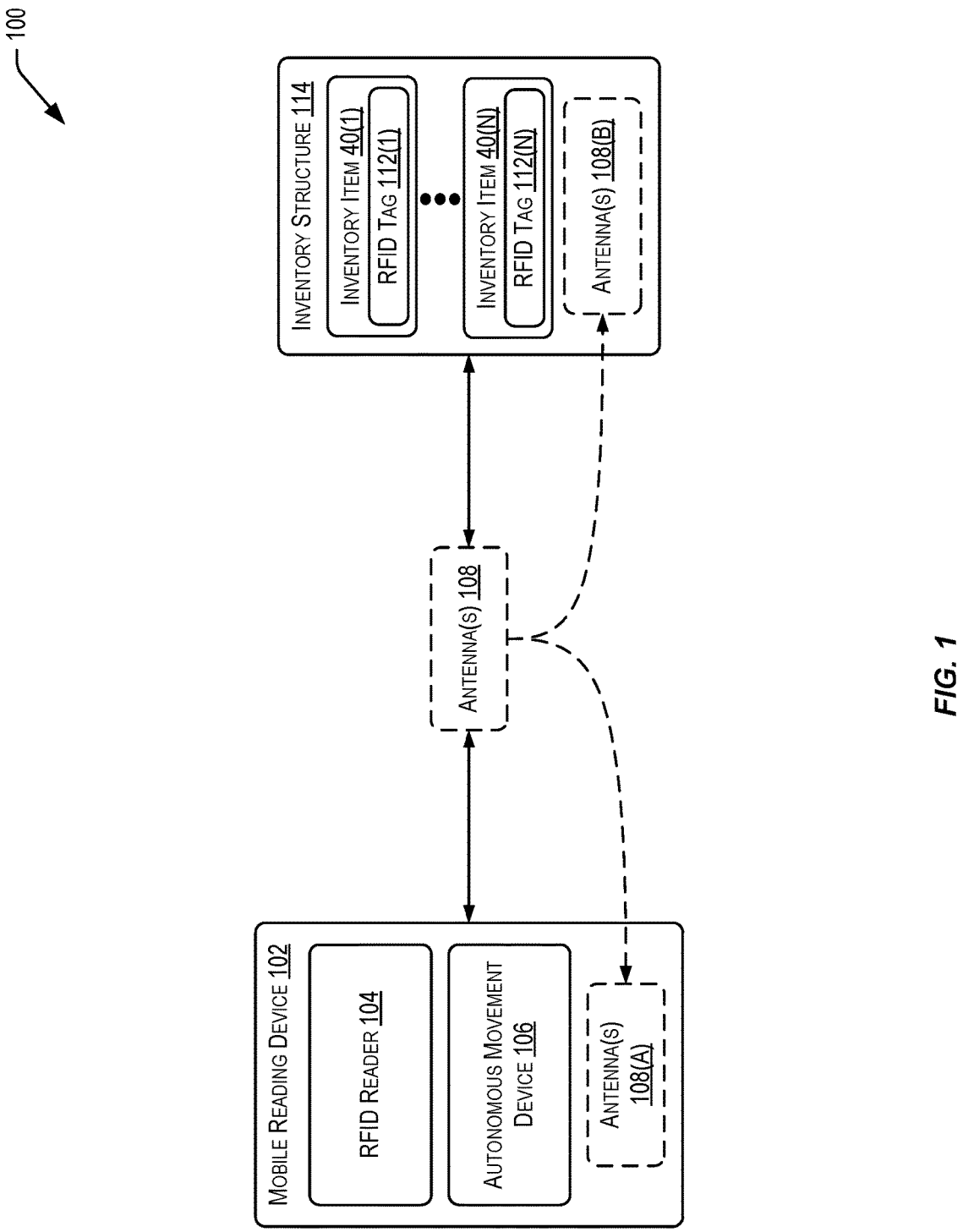
FIG. 1 illustrates an example block diagram of a mobile RFID reading system for implementing techniques relating to reading radio-frequency identification (RFID) tags as described herein, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. The inventory system utilizes systems, methods, and devices for reading radio-frequency identification (RFID) tags within the inventory system. To this end, RFID tags may be attached to individual inventory items, and the inventory items may be tracked as they move throughout the inventory systems. An individual RFID tag may uniquely identify an individual inventory item because a number or identifier associated with the RFID tag may be entirely unique. Specific features herein are directed to mobile reading devices being equipped with RFID readers for reading the RFID tags, and inventory holders for inventory items serving as antennas for the RFID readers on the mobile reading devices.

To read RFID tags (and identify corresponding items (e.g., inventory items)), a mobile reading device, including an RFID reader is provided. The RFID reader is part of a reader system, which also includes one or more antennas. The RFID reader may be configured to transmit radio frequency (RF) energy in the form of RF signals (e.g., an interrogator signal) and receive RF energy in the form of RF signals (e.g., authentication replies) from the RFID tags. The RFID reader may transmit the interrogator signal to the one or more antennas which may direct the interrogator signal in the direction of an inventory structure (e.g., an inventory holder). The interrogator signal may energize the RFID tags attached to the corresponding inventory items stowed within the inventory structure.

Once an RFID tag is energized it may begin to transmit its own RF energy (e.g., an authentication reply). As the RFID reader is configured to receive RF energy, it may receive the authentication reply from the RFID tag. The process of the RFID reader sending an interrogation signal and receiving authentication replies from RFID tags may be characterized as "reading tags." Thus, by reading the RFID tag, the RFID reader may have sufficient information to identify the inventory item; and, in particular, to identify that the inventory item is stowed within the inventory structure.

In one example, inventory items that move throughout an inventory system or are used in connection with the inventory system are each tagged with an RFID tag. The RFID tag uniquely identifies the particular inventory item. This association of RFID tag to inventory item is stored and used to track the location of the inventory item. A mobile reading device, including an autonomous movement device (e.g., an autonomous mobile drive unit or an unmanned aerial vehicle) and an RFID reader, moves throughout the inventory system to different locations and reads the RFID tags to identify the inventory items. The inventory items are stowed within inventory structures (e.g., inventory holders, sets of stowage lockers, rows of inventory holders, etc.) at the different locations. An antenna through which the RFID reader reads the RFID tags is either included with the mobile reading device or is included with the inventory structure. An inventory holder, including one or more elongated members, becomes part of the mobile reading device when it is detachably coupled to the autonomous mobile drive unit and the RFID reader. The coupling of the inventory holder and the RFID reader involves two corresponding electromechanical interfaces (i.e., one from the inventory holder and one from the RFID reader) coupling to create a coupled structure. When coupled, the RFID reader uses the one or more elongated members as the antenna (e.g., to transmit and receive RF energy) to read the RFID tags. When the mobile reading device includes the RFID reader, the autonomous mobile drive unit, and the antenna, the mobile reading device is a standalone device capable moving autonomously along the ground to read the RFID tags. When the mobile reading device includes the RFID reader, the unmanned aerial vehicle, and the antenna, the mobile reading device is a standalone device capable moving autonomously in the air to read the RFID tags.

Generally, RFID refers to a wireless, non-contacting system for transferring data by way of radio frequency electromagnetic fields. In an RFID system, data transfers occur in the form of modulated signals transmitted between an RFID tag (or an RFID device), which may include various communication components, antennas, logic or circuitry, and an RFID reader, which may include various communication components, antennas, logic, circuitry or other like devices. Data stored within a microchip or other storage device associated with the RFID tag may be sent to the RFID reader, which may interpret not only the data received in the RFID signal but also other relevant information or attributes of the RFID signal, such as an intensity or a frequency of the RFID signal, as well as a direction from which the RFID signal originated, a range traveled by the RFID signal or at least some of the information or data included in the RFID signal. The transfer of the RFID signal is initiated when an electric field or a magnetic field transmitted by an RFID reader is sensed by an RFID tag, which transmits information or data that may be stored in association with the RFID tag in one or more microchips or other storage devices.

RFID systems provide a number of advantages over similar systems for the short-range transfer of information or data. First, an RFID tag may be formed of components having remarkably small, compact shapes and sizes, and tags that are as thin as a sheet of paper or smaller than a grain of rice are quite common. Additionally, unlike a bar code (e.g., a one-dimensional bar code or a two-dimensional "QR" code), an RFID tag need not be provided within a line of sight of an RFID reader in order to successfully transmit data. Therefore, RFID tags may be concealed or embedded into many different types of objects of any size or shape, as well as humans or other animals. Next, an RFID tag may be programmed with a fixed set or packet of "read-only" data which may be transmitted to an RFID reader countless number of times in theory, or reprogrammed with modifiable sets of data that may be written and rewritten, as needed, based on the application in which the RFID tag is provided. Moreover, and perhaps most importantly, while an active RFID tag includes and utilizes a local power source, such as a battery, a passive RFID tag does not require any power in order to successfully transmit a set or packet of data to an RFID reader, and may therefore transmit such data when power supplies are unavailable or in environments where providing power to the RFID tag is infeasible.

RFID signals may be transmitted from an RFID tag to an RFID reader in many different formats and at many different frequency levels. An RFID tag that transmits signals within low frequency (LF), medium frequency (MF) or high frequency (HF) levels (e.g., approximately 3 kilohertz to 30 megahertz, or 3 kHz-30 MHz) may transfer relatively small-sized sets or packets of data over short ranges (e.g., between ten and one hundred centimeters, or 10-100 cm). Other RFID tags may transmit signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

A signal transmission from an RFID tag to an RFID reader may be achieved in any number of ways. An inductively coupled RFID tag is an RFID tag that is powered by energy obtained from magnetic fields generated by an RFID reader, and may be coupled to the RFID reader using this energy. In this regard, an RFID reader may include one or more coils through which an electric current may pass, thereby causing a magnetic field to be generated by the RFID reader according to Ampere's Law. Likewise, an inductively coupled RFID tag may also include one or more coils. When the RFID tag passes within a particular range of the RFID reader, an electric current is generated within the coils of the RFID tag, thereby coupling the RFID reader and the RFID tag based on the magnetic flux passing through the respective sets of coils. The electric current passing through the coils of the RFID tag may then power internal circuits within the RFID tag, and cause an RFID signal to be transmitted from the RFID tag to the RFID reader accordingly. Thus, inductively coupled RFID tags are commonly used in powerless environments where a passive system for transmitting signals may be required.

Additionally, an RFID tag may be coupled by any number of other modes. For example, capacitively coupled RFID tags include coupling plates that are designed to correspond to a plate of an RFID reader. When the RFID tag is placed in sufficiently close proximity to the RFID reader, thereby causing the corresponding coupling plates of the RFID tag and the RFID reader to be aligned in parallel with one another and within a short range, a transfer of data from the RFID tag to the RFID reader is achieved. Unlike an inductively coupled RFID tag, which is powered by a magnetic field generated by an RFID reader, a capacitively coupled RFID tag is powered by an alternating electric field generated by an RFID reader. For this reason, capacitively coupled RFID tags usually have more limited operating ranges than inductively coupled RFID tags and are typically employed in near-field communication environments. Similarly, a backscatter-coupled RFID tag receives power emitted from an RFID reader's antenna. A portion of the emissions from the RFID reader are received by a corresponding antenna of the RFID tag and may be filtered or rectified, as necessary, in order to trigger a transfer of data from the RFID tag to the RFID reader. Any type or mode of coupling between an active, semi-active (e.g., powered on a temporary basis or for limited purposes) or passive RFID tag and an RFID reader may be utilized in accordance with the present description.

In addition to RFID tags which are automatically coupled with an RFID reader, the systems and methods of the present description may further include an RFID tag, such as a passive RFID tag, which may be manually activated, e.g., coupled upon a manual action, by a human or machine in order to cause a transmission of a data signal from the RFID tag to one or more RFID readers. A manually activated RFID tag may include physical or virtual switches that may close a circuit within the RFID tag and thereby permit the RFID tag to function as a data transmitter in the presence of an electric or magnetic field. For example, a manually activated RFID tag may include capacitive elements that define a capacitor within the RFID tag, and may effectively close a circuit within the RFID tag when such elements detect bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance of such elements in a vicinity of a location touched by the body (e.g., a digit such as a finger or thumb), due to disruptions in electrical fields caused by the body's presence, thereby further causing a change in the time constant of the RFID tag, and a discharge of the capacitor in an amount that may be defined as a function of the resistance of the capacitive elements.

According to some embodiments, such capacitive elements may be formed into a layered stack or may include a substantially linear or planar gap or break, and may be covered with a flexible protective layer formed from one or more plastics or rubbers (e.g., acrylics, vinyls, polyurethanes or the like), or other like materials. The protective layer may be adhered to one or more capacitive elements of an RFID circuit, which may include elements formed from a conductive material such as aluminum, copper, silicon or indium tin oxide that are separated by an air gap. When a user touches a protective layer of an RFID tag with a finger, which is a bioelectric conductor, a change in the effective capacitance (on the order of approximately one picofarad) between the elements, which are also conductors, in a vicinity of a point or points of contact with the protective layer is introduced. Such contact forms a conductive bridge across the elements, thereby causing disruptions in electrical fields in the vicinity of one or more of the elements, and further causing an internal current flow through the RFID tag circuit.

In addition to capacitive elements, a circuit of an RFID tag may include other components for enabling a manual actuation thereof by a human or a machine, including one or more substantially planar conductive elements that may be separated by an air gap. Such an air gap between the conductive elements defines an open switch within the circuit of the RFID tag, which may also be covered with a flexible protective layer that may be formed from one or more plastics, rubbers or other like materials. When a user contacts an external surface of the RFID tag corresponding to the air gap, e.g., the flexible protective layer over the air gap, at least two of the conductive elements are placed in contact with one another, thereby bridging the air gap between the conductive elements and closing the open switch. Subsequently, an internal current flow through the RFID tag circuit is enabled. Because the bridging of the air gap and the closure of the open switch is registered by manually driven electrical contact, a manually activated RFID tag including substantially planar conductive elements does not require bioelectricity in order to operate properly, and a user may interact with the RFID tag using not only his or her fingers or hands (which may be gloved or ungloved) but also a stylus, a pointer or another like object.

Turning now to the figures, FIG. 1 illustrates a mobile RFID reading system 100 depicting techniques relating to reading RFID tags as described herein. The mobile RFID reading system 100 may include a mobile reading device 102. The mobile reading device 102 may include an RFID reader 104, an autonomous movement device 106, and, in some examples, one or more antenna(s) 108(A). The RFID reader 104 may be implemented in an active reader passive tag system. In other examples, the RFID reader 104 may be implemented in a passive reader active tag system, an active reader active tag system, or any other suitable reader system and tag combination. The RFID reader 104 may be configured to read RFID tags using any suitable frequency band, including low frequency bands, high frequency bands, ultra-high frequency bands, microwave bands, and any other suitable frequency bands. The RFID reader 104 may be configured to read, via the antenna 108 (e.g., any combination of the antennas, 108(A), 108(B)), one or more RFID tags 112(1)-112(N) attached to one or more inventory items 40(1)-40(N) stowed in an inventory structure 114. By reading the one or more RFID tags 112(1)-112(N), the RFID reader 104 is enabled to identify the one or more inventory items 40(1)-40(N). The inventory structure 114 may be any suitable inventory structure as described herein. In some examples, the inventory structure 114 may be an inventory holder 30 (FIG. 6), a combination or grouping of more than one inventory holder 30, a set of stowage lockers, or any other suitable location wherein items (e.g., the inventory items 40(1)-40(N) and other items used in association with an inventory system (e.g., hard hats, safety glasses, cones, parts, tools, computers, laptops, hand-held readers, inventory bins, totes, and the like)) may be stowed.

In some examples, the antenna 108 is illustrated in dashed lines at least because the antenna 108 may be optionally included within either the mobile reading device 102 and/or the inventory structure 114. Thus, depending on the implementation, the antenna 108 may be included within one of a variety of different components of the mobile RFID reading system 100. In some examples, other components of the mobile RFID reading system 100 may be included within other different components of the mobile RFID reading system 100.

In some examples, a frame portion (not shown) of the inventory structure 114 may be configured to act as an antenna. Thus, in this example, the antenna 108(B) may be included within the inventory structure 114 at least because the frame portion of the inventory structure 114 is acting as the antenna 108(B). In some examples, the antenna 108 may be any suitable antenna including a linear polarized antenna, a monostatic circular antenna, a bistatic circular antenna, or any combination of the antennas just described.

Figure 7:
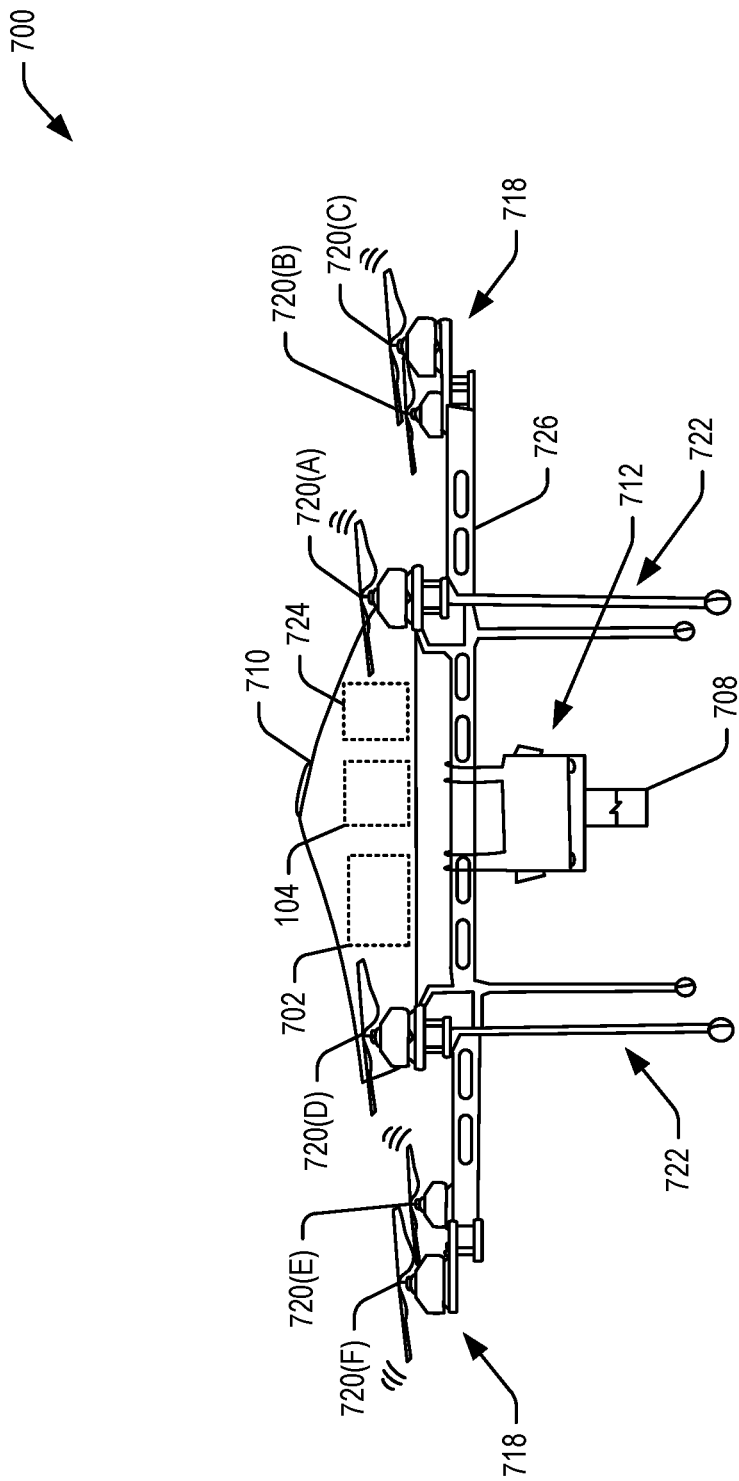
FIG. 7 illustrates an example unmanned-aerial vehicle (UAV) for implementing techniques relating to reading RFID tags as described herein, according to at least one embodiment.

The autonomous movement device 106 is any suitable device configured to move the mobile reading device 102. In some examples, the autonomous movement device 106 includes a mobile drive unit 20 (FIGS. 2, 4 and 5) or an unmanned aerial vehicle (UAV) 700 (FIG. 7). As described herein, the UAV 700 may also include the RFID reader 104 and the antenna 108(A). In other words, the UAV 700 may, in some examples, be an example of the mobile reading device 102. In other examples, the UAV 700 includes the RFID reader 104 and the antenna 108(A) located at a location independent of the UAV 700.

Figure 2:
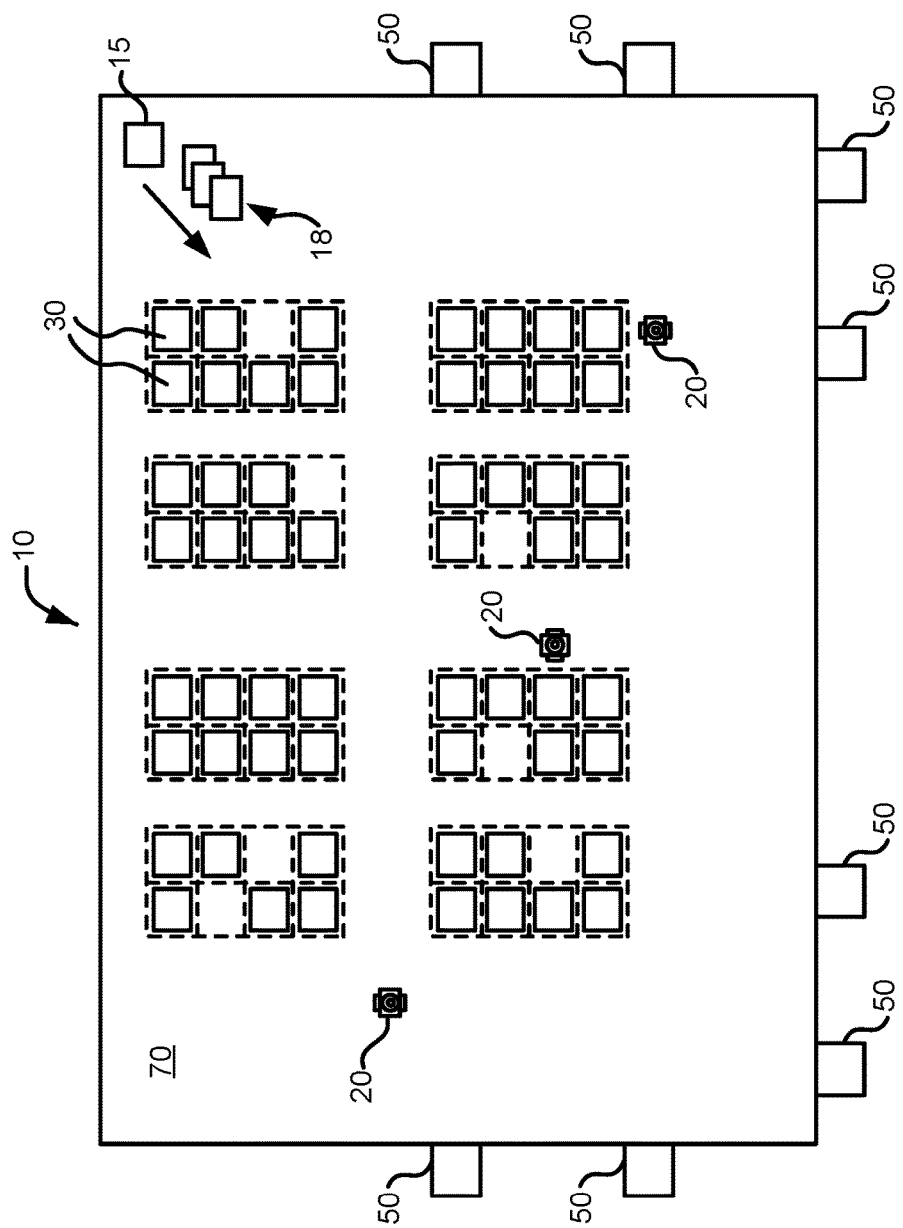
FIG. 2 illustrates components of an inventory system according to at least one embodiment.

FIG. 2 illustrates the contents of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
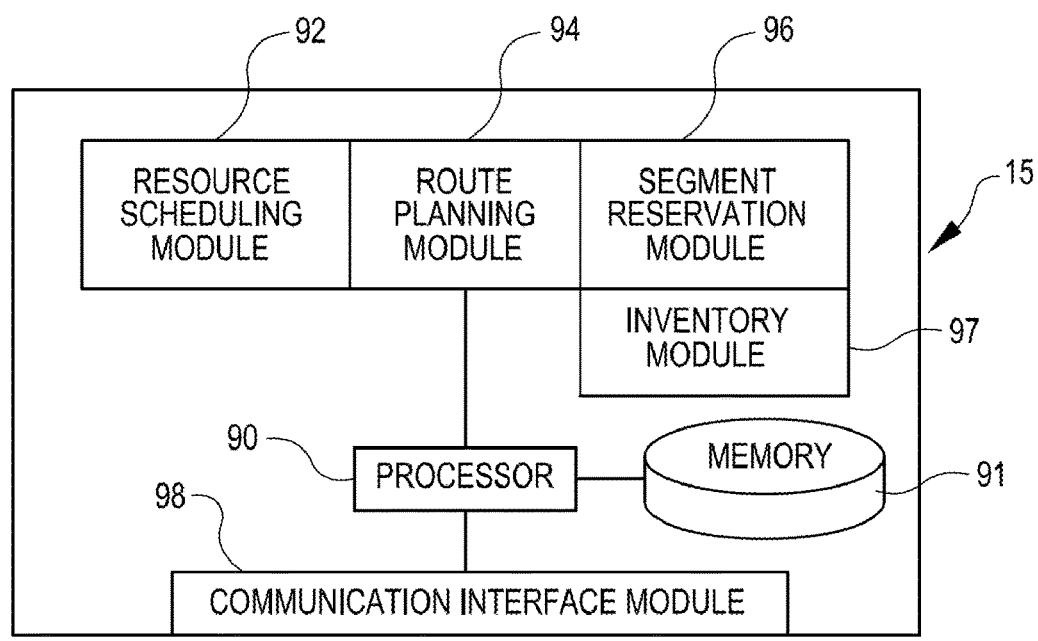
FIG. 3 illustrates in greater detail the components of an example management module that may be utilized in at least embodiment of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
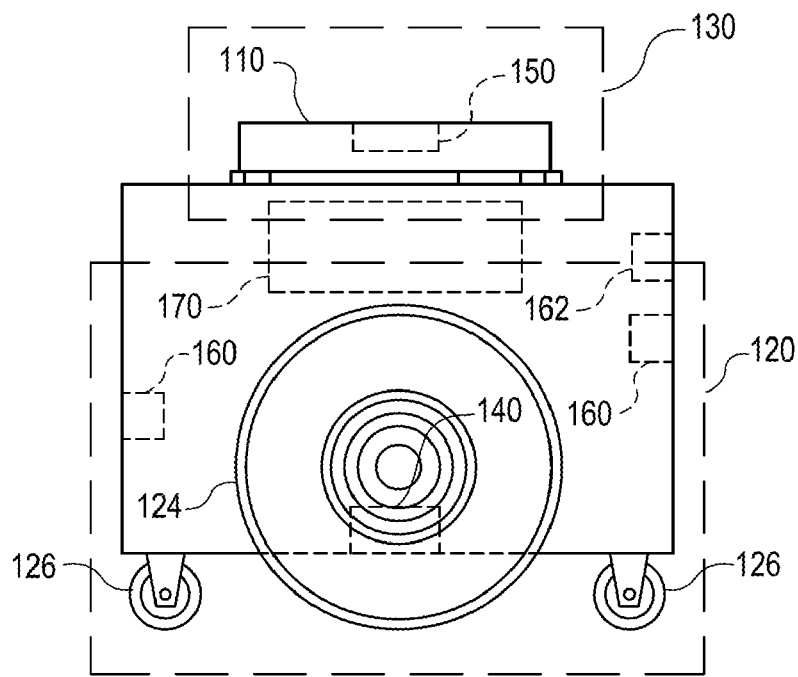
FIGS. 4 and 5 illustrate in greater detail an example mobile drive unit that may be utilized in at least one embodiment of the inventory system shown in FIG. 2.
Figure 5:
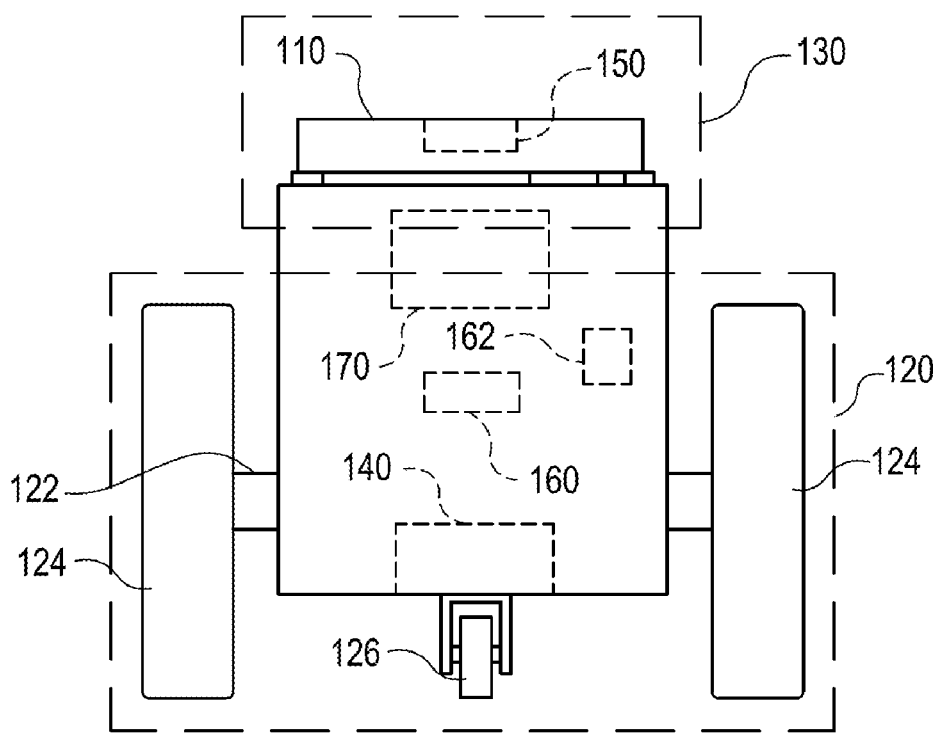

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
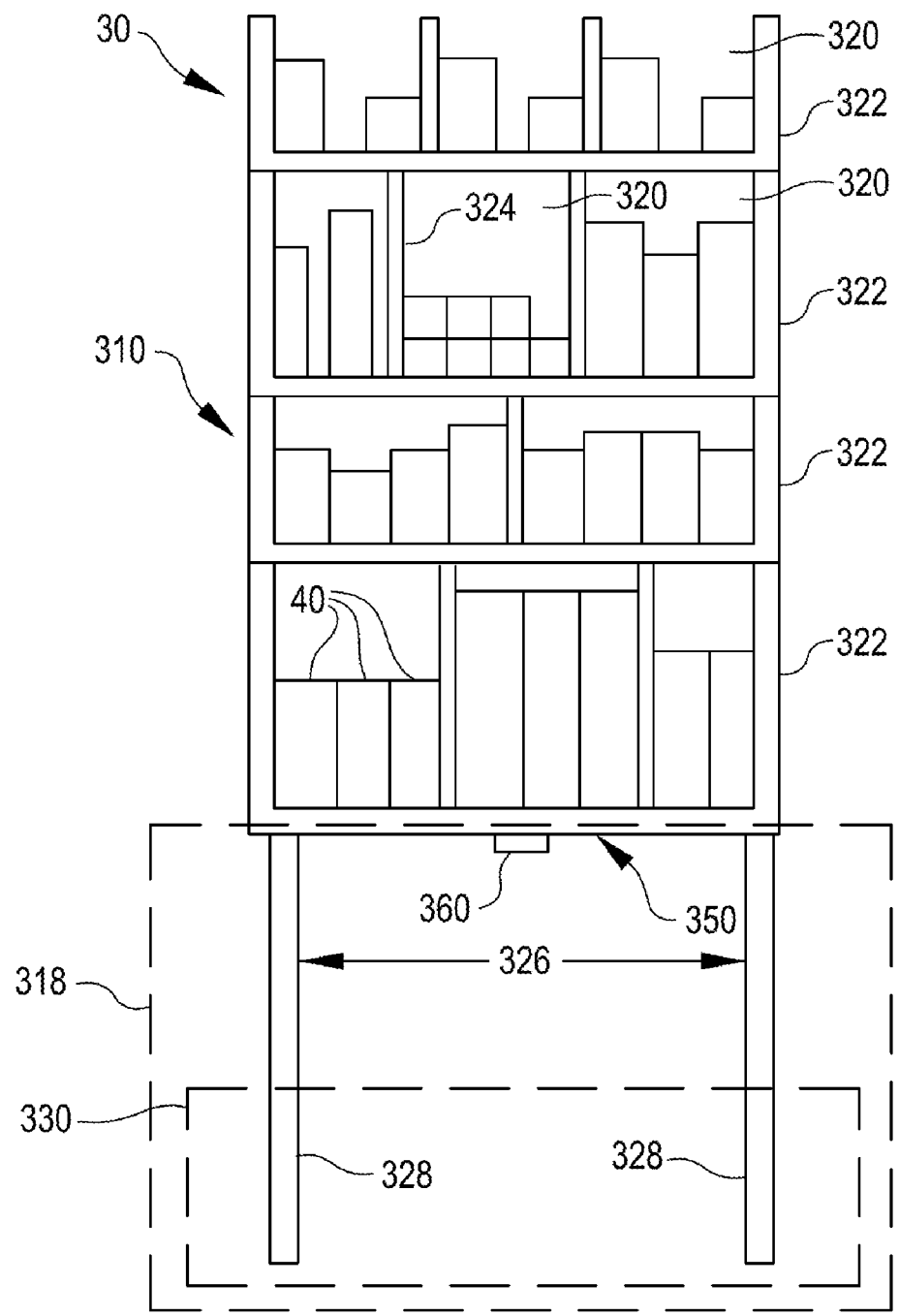
FIG. 6 illustrates in greater detail an example inventory holder that may be utilized in at least one embodiment of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

As introduced previously, features herein are directed to mobile reading devices being equipped with RFID readers for reading the RFID tags, and inventory holders for inventory items serving as antennas for the RFID readers on the mobile reading devices. Features are also directed to configurations of mobile reading devices including an RFID reader and at least one of a mobile drive unit, an antenna, or an inventory holder.

FIG. 7 illustrates an example unmanned-aerial vehicle (UAV) for implementing techniques relating to reading RFID tags as described herein. The UAV 700 may be designed in accordance with commercial aviation standards and may include multiple redundancies to ensure reliability. For purposes of this specification, the UAV 700 may include a plurality of systems or subsystems operating under the control of, or at least partly under the control of, a UAV management module 702. The UAV management module 702 may be included in an onboard computer for autonomously or semi-autonomously controlling and managing the UAV 700 and, in some examples, for enabling remote control by a pilot. In some examples, the UAV management module 702 is split between the UAV 700, the management module 15, and other systems for managing inventory flow within the inventory system 10. Portions of the UAV management module 702, including the onboard computer, may be housed under top cover 710. As used herein, the UAV management module 702 may be part of system that includes a power supply 724 and assemblies (e.g., rechargeable battery, liquid fuel, and other power supplies) (some not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 700 and detecting objects) (not shown), the RFID reader 104, and interfaces capable of speech interpretation and recognition (not shown).

The RFID reader 104 of the UAV 700 may be in communication with one or more deployable antennas 708 within an antenna management system 712. The deployable antenna 708 is an example of the antenna 108. While one deployable antenna 708 is illustrated, it is understood that one or more than one antenna may be managed by the antenna management system 712. In some examples, the UAV 700 includes one or more antennas 108 that are not considered deployable antennas. The UAV 700 may be an example of the mobile reading device 102 and may therefore exclude the one or more antennas 108 and the deployable antenna 708. For example, the UAV 700 may be configured to navigate to the inventory structure 114, connect to the one or more antennas 108 associated with the inventory structure 114, and read the RFID tags 112(1)-112(N) associated with the inventory items 40(1)-40(N) stowed in the inventory structure 114. In this manner, the UAV 700 may include one or more electromechanical interfaces (not shown) that may be used to couple to corresponding electromechanical interfaces to connect the RFID reader 104 to the one or more antennas 108.

The UAV management module 702 manages the flight paths and movement of the UAV 700 and also manages the other systems of the UAV 700 (e.g., the antenna management system 712, which manages the operation of the deployable antennas 708). For example, the antenna management system 712 may receive instructions from the UAV management module 702 to deploy the deployable antenna 708. The deployable antenna 708 may be deployable, e.g., telescoping, extending, unrolling, etc., according to its construction. In this manner, the deployable antenna 708 may be one or more antennas included within or attached to a flexible member (e.g., a plastic member, a rubber member, and the like). The deployable antenna 708 may also be one or more antennas included within or attached to a rigid or semi-rigid member (e.g., metal, hard plastic, carbon fiber, composite, and the like). The antenna management system 712 may be configured to deploy the deployable antenna 708 in a manner to read the RFID tags 112(1)-112(N). In some examples, this may include deploying the deployable antenna 708 within a channel (e.g., within a reading channel of an inventory holder 30), while the UAV 700 hovers over the channel.

The RFID reader 104 of the UAV 700 may be configured to read, via the deployable antennas 708, the RFID tags 112(1)-112(N) to identify the inventory items 40(1)-40(N). Further, the UAV 700 may include a propulsion system 718. In some examples, the propulsion system 718 is an example of the autonomous movement device 106. In some examples, the propulsion system 718 may include rotary blades or otherwise be a propeller-based system. In some examples, the propulsion system 718 may include or be associated with one or more fixed wings. As illustrated in FIG. 7, the propulsion system 718 may include a plurality of propulsion devices, a few of which, 720(A)-720(F), are shown in this view. Each propeller device may include one propeller, a motor, wiring, a balance system, a control mechanism, and other features to enable flight. In some examples, the propulsion system 718 may operate at least partially under the control of the UAV management module 702. In some examples, the propulsion system 718 may be configured to adjust itself without receiving instructions from the UAV management module 702. Thus, the propulsion system 718 may operate semi-autonomously or autonomously. The propulsion system 718 may enable multi-directional flight of the UAV 700 (e.g., by adjusting each propeller device individually). In this manner, the UAV 700 may be configured to move throughout the inventory system 10 by adjusting the features of the propulsion system 718.

Figure 9:
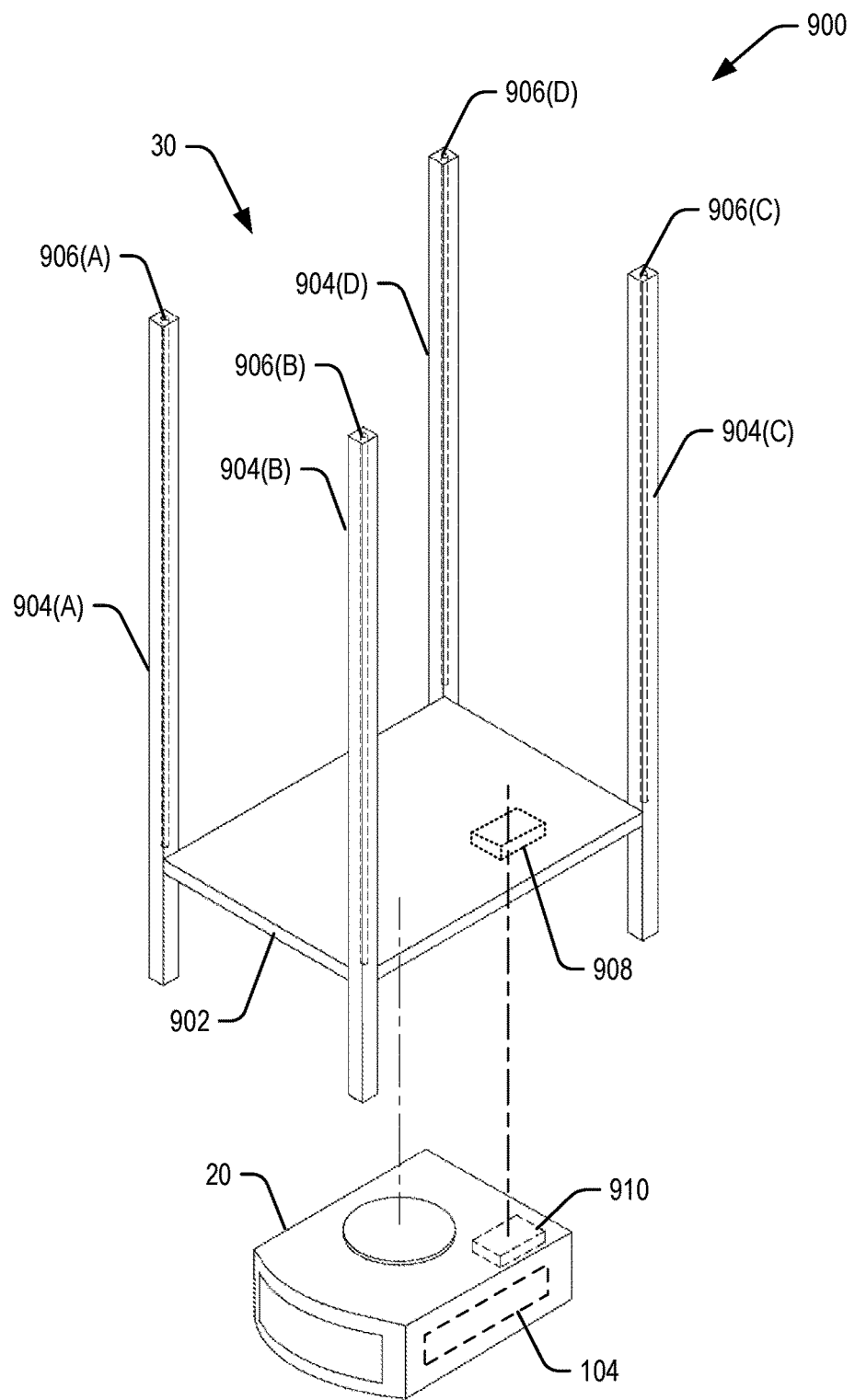
FIG. 9-11 illustrate example mobile RFID reading systems for implementing techniques relating to reading RFID tags as described herein, according to at least one embodiment.

The UAV 700 may also include landing structure 722. The landing structure 722 may be adequately rigid to support the UAV 700. The landing structure 722 may include a plurality of elongated legs which may enable the UAV 700 to land on and take off from a variety of different surfaces. For example, the UAV 700 may land on or near the inventory structure 114 (e.g., the inventory holder 30). The plurality of systems, subsystems, and structures of the UAV 700 may be connected via a frame 726. The frame 726 may be constructed of a rigid material and be capable of receiving via different connections the variety of systems, sub-systems, and structures. For example, the landing structure 722 may be disposed below the frame 726 and, in some examples, may be formed from the same material and/or same piece of material as the frame 726. The propulsion system 718 may be disposed radially around a perimeter of the frame 726 or otherwise distributed around the frame 726. The UAV 700 may also include one or more electromechanical interfaces (not shown). The one or more electromechanical interfaces may be in electrical communication with the RFID reader 104 and be configured to couple with corresponding electromechanical interfaces situated at and/or within different inventory structures 114. The corresponding electromechanical interfaces may be in electrical communication with one or more antennas and/or cause one or more conductive elements to function as antennas when the electromechanical interfaces are coupled. For example, the inventory structure 114 may be an example of the inventory holder 30 and may include a metal frame that may function as an antenna. The antennas, whether included with the UAV 700 or otherwise, may include male and female interfaces (e.g., plug and socket, pins and connectors, and any other suitable male/female interface), at least two flat surfaces, at least two smooth surfaces, screw and thread interfaces, a hook and clasp interface, an interconnection (not male/female), and any other suitable combination of interfaces. In FIG. 9 (and other figures) are illustrated example configurations for connecting the RFID reader 104 included within the autonomous movement device 106 to certain antennas. As discussed below, when the UAV 700 includes the RFID reader 104, the UAV 700 may connect to antennas in a manner similar to the autonomous movement device 106. In some examples, the electromechanical interfaces may include one or more magnets for holding or otherwise coupling the corresponding interfaces together. The magnets may be electrically charged (i.e., electromagnets).

Figure 8:
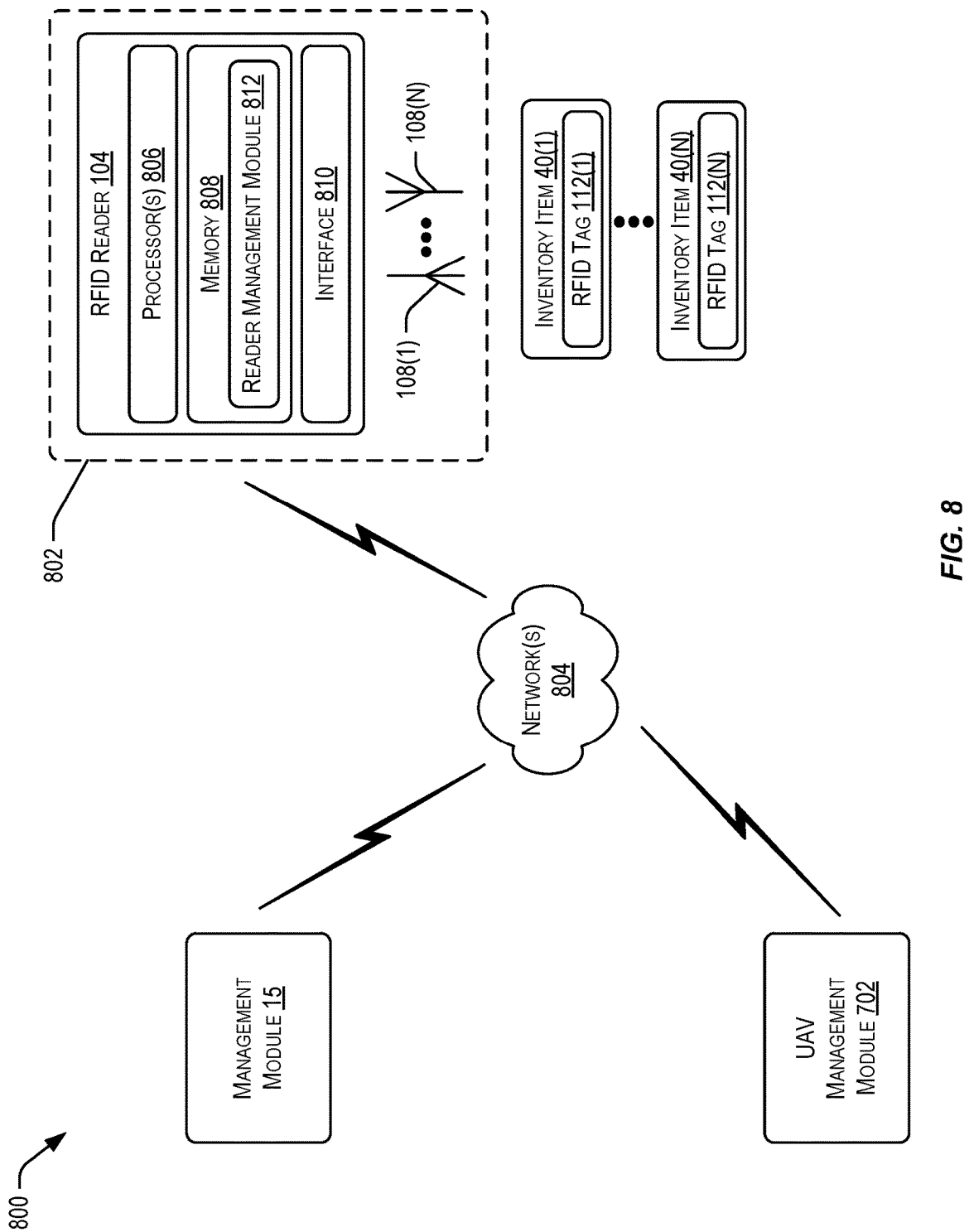
FIG. 8 illustrates an example schematic architecture for implementing techniques relating to reading RFID tags as described herein, according to at least one embodiment.

FIG. 8 illustrates an example schematic architecture 800 for implementing techniques relating to reading RFID tags as described herein. The architecture 800 may include the management module 15, the UAV management module 702, and a reader system 802 in communication with each other via one or more network(s) 804. The architecture 800 may be implemented as part of implementing the inventory system 10. Thus, the inventory system 10 may include the management module 15, the UAV management module 702, and the reader system 802. The components of the reader system 802 may be arranged in various manners in accordance with techniques described herein. For example, the RFID reader 104 may be included within the UAV 700, the mobile drive unit 20, the mobile reading device 102, or any combination of the foregoing. Moreover, the antennas 108(1)-108(N) may be included within the UAV 700, the mobile reading device 102, the inventory holder 30, the inventory structure 114, or any combination of the foregoing. In some examples, at least a first portion of the reader system 802 is within a first component (e.g., the RFID reader 104 within the mobile drive unit 20) and a second portion of the reader system 802 is within a second component (e.g., the antennas 108(1)-108(N) within the inventory holder 30).

As discussed above, the management module 15 may be configured to manage the movement and operation of the mobile drive units 20. Additionally as discussed above, the UAV management module 702 may be configured to manage the movement and operation of the UAV 700. The reader system 802 may be configured to manage the reading of the RFID tags 112 attached to the inventory items 40, whether stowed within the inventory holder 30 (not shown) or some other inventory structure 114. To this end, the reader system 802 may be any suitable RF reader system capable of reading RFID tags and may therefore include the RFID reader 104 and the antennas 108(1)-108(N).

The RFID reader 104 may include one or more chips, integrated circuits, computers, or the like in order to read the RFID tags 112. Accordingly, the RFID reader 104 may include one or more processors 806, memory 808, and an interface 810. The processors 806 may include one or more general purpose computers, dedicated microprocessors, or other processing devices capable of communicating electronic information. Examples of the processor 806 include one or more application-specific integrated circuits (ASICs), field programmable gate arrays (FPGAs), digital signal processors (DSPs) and any other suitable specific or general purpose processors. Computer-executable instruction, software or firmware implementations of the processor 806 may include computer-executable or machine-executable instructions written in any suitable programming language to perform the various functions described. Thus, the processor 806 may be configured to access the one or more applications, engines, modules, or components of the memory 808 to perform the techniques described herein.

The memory 808 may include more than one memory and may be distributed. The memory 808 may store program instructions (e.g., a reader management module 812) that are loadable and executable on the processor 806, as well as data generated during the execution of these programs. Depending on the configuration and type of memory including the reader management module 812, the memory 808 may be volatile (such as random access memory (RAM)) and/or non-volatile (such as read-only memory (ROM), flash memory, or other memory). Within the memory 808 may be stored unique tag IDs associated with the RFID tags 112. Thus, after a particular RFID tag 112 has been read, identifying information for that RFID tag may be retained in the memory 808 prior to being provided to other components of the inventory system 10 (e.g., an inventory management system configured to manage all inventory items).

The interface 810 of the RFID reader 104 may comprise one or more interfaces, each of which may be configured to receive inputs and provide outputs relating to reading the RFID tags 112. For example, the interface 810 may be an antenna interface capable of connecting the antennas 108(1)-108(N) to the RFID reader 104. Thus, the interface 810 may enable the RFID reader 104 to communicate with the RFID tags 112 via the antennas 108. The antennas 108 may be any suitable antennas configured to transmit and receive RF energy. In some examples, the interface 810 includes an electromechanical interface configured to transmit RF energy when coupled to a corresponding electromechanical interface (e.g., an electromechanical interface connected to an antenna, metal structure that may function as an antenna, and the like). In some examples, the interface 810 and the corresponding interfaces (not shown) may include male and female interfaces (e.g., plug and socket, pins and connectors, and any other suitable male/female interface), at least two flat surfaces, at least two smooth surfaces, screw and thread interfaces, a hook and clasp interface, an interconnection (not male/female), and any other suitable combination of interfaces. In FIG. 9 (and other figures) are illustrated example configurations for connecting to the antennas 108. In some examples, the electromechanical interfaces may include one or more magnets for holding or otherwise coupling the corresponding interfaces together. The magnets may be electrically charged (i.e., electromagnets).

The reader management module 812 may be configured to manage one or more sub-modules, components, and/or services directed to examples disclosed herein. In some examples, the reader management module 812 may include a communication module (not shown) and a reader control module (now shown). While these modules will be described as performing discrete tasks with reference to the flow charts, it is understood that FIG. 8 illustrates example configurations and other configurations performing other tasks and/or similar tasks as those described herein may be implemented according to the techniques described herein. In some examples, the reader management module 812 may be implemented, as appropriate, in hardware or software.

The communication module of the reader management module 812 may be configured to receive requests from other components of the architecture 800 and communicate responses to other components of the architecture 800. For example, the communication module may receive and evaluate a request to read the RFID tags 112. The request may come from the management module 15 or any other suitable module. In some examples, the communication module may provide inventory information to an inventory management system. Such inventory information may include indications of the RFID tags 112 (or other RFID tags (e.g., an inventory holder RFID tag)) that have been identified by the RFID reader 104.

The reader control module of the reader management module 812 may be configured to manage the transmission of RF energy via the antennas 108 and the collection of RF energy via the antennas 108. For example, the reader control module may determine when to turn on and when to turn off the RFID reader 104 and/or the antennas 108. The reader control module may determine the unique tag IDs for each of the RFID tags 112 read by the RFID reader 104. In some examples, the reader control module may be configured to read and suppress RFID tags. For example, after the reader control module has read the RFID tag 112(1), the reader control module may suppress the RFID tag 112(1) in order to focus on the other RFID tags (e.g., 112(2)-112(N)). In this manner, the RFID reader 104 may focus its search for RFID tags. The reader control module may also manage signal conversion of the signals received via the antennas 108.

After one of the RFID tags 112 is read by the RFID reader 104, an indication of the read tag may be saved within the memory 808 in the form of a list. The list may be provided to other components of the inventory system 10, and, in some examples, may be compared by the RFID reader 104 (or other component) to a manifest in which the RFID tags 112(1)-112(N) are associated with their corresponding inventory items 40(1)-40(N). For example, the manifest may include a table that includes the unique tag ID identifying the RFID tag 112(1), a product identification code identifying the inventory item 40 (e.g., a universal product code (UPC), a European article number (EAN), an international standard book number (ISB), an Amazon standard identification number (ASIN), or the like), and any other suitable information and/or characteristics to identify the inventory item 40. This table may be accessed by the reader management module 812 to perform the techniques described herein. In some examples, a portion of the manifest may be provided to the RFID reader 104 to perform the techniques described herein.

FIG. 9 illustrates an example of mobile RFID reading system 900 for implementing techniques relating to reading RFID tags as described herein. The mobile RFID reading system 900 is an example of the mobile RFID reading system 100. The mobile RFID reading system 900 may include the inventory holder 30 and the mobile drive unit 20. The mobile drive unit 20 is an example of the autonomous movement device 106. The inventory holder 30 is an example of the inventory structure 114. As illustrated, the inventory holder 30 is illustrated without any compartments. In some examples, the inventory holder 30 may include a frame 902 and one or more elongated members 904(A)-904(D) that provide structural support for the compartments. Accordingly, the frame 902 and the one or more elongated members 904(A)-904(D) may be constructed of any suitable rigid material (e.g., steel, aluminum, stainless steel, plastic, wood, cardboard, and other rigid materials). In some examples, the frame 902 and the one or more elongated members 904(A)-904(D) may be constructed of a conductive material (e.g., steel, aluminum, and other conductive metals) such that the one or more elongated members 904(A)-904(D) may function as one or more antennas as described herein. In some examples, more or less elongated members than is illustrated may be provided.

The frame 902 may include a first electromechanical interface 908. The first electromechanical interface 908 may be configured to couple with a second electromechanical interface 910 of the mobile drive unit 20. The first electromechanical interface 908 may include any suitable interfaces as described herein. In some examples, the first electromechanical interface 908 is in electrical communication with the one or more elongated members 904(A)-904(D) and/or the frame 902. This may include, for example, any suitable combination of electrodes, wires, or the like. Similarly, the second electromechanical interface 910 may be in electrical communication with the RFID reader 104 that is located on board the mobile drive unit 20. In some examples, the frame 902 and/or the one or more elongated members 904(A)-904(D) may be configured to act as one or more antennas to transmit RF energy from the RFID reader 104 and detect RF energy from the RFID tags 112 and pass it to the RFID reader 104.

In some examples, enabling the frame 902 and/or the one or more elongated members 904(A)-904(D) of the inventory holder 30 to function as one or more antennas may include coupling the RFID reader 104 and the frame portion of the inventory structure 114 via the first electromechanical interface 908 and the second electromechanical interface 910. The first electromechanical interface 908 may be coupled to the second electromechanical interface 910 in a manner that results in a coupled structure (e.g., a coupling that electromechanically couples the two interfaces). In some examples, the coupled structure may also enable RF energy to transfer between the first electromechanical interface 908 and the second electromechanical interface 910. Thus, the RFID reader 104 may send interrogation signals in the form of RF energy via the coupled structure to the frame 902 and/or the one or more elongated members 904(A)-904(D) of the inventory holder 30. As the frame 902 and/or the one or more elongated members 904(A)-904(D) of the inventory holder 30 receive the interrogation signals, they may transmit the RF energy in one or more directions. For example, the one or more elongated members 904(A)-904(D) may transmit RF energy towards the middle of the inventory holder 30 when the inventory holder is fully assembled (i.e., including the compartments and not just the frame and legs). Such transmission may enable the RFID reader 104 to read the RFID tags 112 associated within the inventory items 40 stowed within the compartments of the inventory holder 30. As the RF energy is received by the RFID tags 112, the RFID tags 112 may transmit responses, which may be detected by the frame 902 and/or the one or more elongated members 904(A)-904(D) of the inventory holder 30 and passed to the RFID reader 104. In some examples, the RFID reader 104 may be connected to the mobile drive unit 20 by the mobile drive unit 20 being detachably coupled to the inventory holder 30.

The shape, construction, and/or structure of the one or more elongated members 904(A)-904(D) may cause the RF energy to be directed in predictable directions when the one or more elongated members 904(A)-904(D) function as antennas. For example, while the one or more elongated members 904(A)-904(D) are illustrated as having a square tubular construction, other constructions are contemplated. For example, the one or more elongated members 904(A)-904(D) may be constructed using any shape of material such as rectangular or round tubing, angle (e.g., "L" shaped angle with different or the same length of legs), channel, I-beam, flat stock, or any other suitable shape. In some examples, when L shaped members are used they may be aligned to project RF energy towards the center of the inventory holder 30. In some examples, the one or more elongated members 904(A)-904(D) may include other material and/or substances to improve or otherwise augment their capabilities as antennas. For example, the one or more elongated members 904(A)-904(D) may include reflectors attached to the outside surfaces of the one or more elongated members 904(A)-904(D) to reflect RF energy towards the center of the inventory holder 30. In some examples, the one or more elongated members 904(A)-904(D) may, when functioning as the antennas, each transmit a reading field that is directed toward the center of the inventory holder 30. The reading fields of each of the elongated members 904(A)-904(D) may at least partially overlap.

In some examples, the one or more elongated members 904(A)-904(D) may be in an inactive or dormant state prior to the first electromechanical interface 908 and the second electromechanical interface 910 being coupled. After being coupled and when the RFID reader 104 begins to read, the one more elongated members 904(A)-904(D) may be in an active state because they are functioning as antennas. In some examples, the mobile drive unit 20 may enable the coupling of the first electromechanical interface 908 and the second electromechanical interface 910 by raising the second electromechanical interface 910 to meet the first electromechanical interface 908 when the mobile drive unit 20 is detachably coupling to the inventory holder 30 as described herein. In this manner, the inventory holder 30 and the mobile drive unit 20 may be detachably coupled at least via the first electromechanical interface 908 and the second electromechanical interface 910.

In some examples, the inventory holder 30 may include one or more antennas 906(A)-906(D). The one or more antennas 906(A)-906(D) may be any suitable antennas capable of being attached and/or mounted to or within the one or more elongated members 904(A)-904(D). For example, the one or more antennas 906(A)-906(D) may be flexible coaxial antennas and may be wrapped around the one or more elongated members 904(A)-904(D) or laid within the one or more elongated members 904(A)-904(D). Similarly as above, the one or more antennas 906(A)-906(D) may be in an inactive or dormant state prior to the first electromechanical interface 908 and the second electromechanical interface 910 being coupled. After being coupled and when the RFID reader 104 begins to read the one or more antennas 906(A)-906(D), the one or more antennas 906(A)-906(D) may be in an active state because they are functioning as antennas. Thus, the one or more antennas 906(A)-906(D) may be activated in the same manner as the one or more elongated members 904(A)-904(D).

Figure 10:
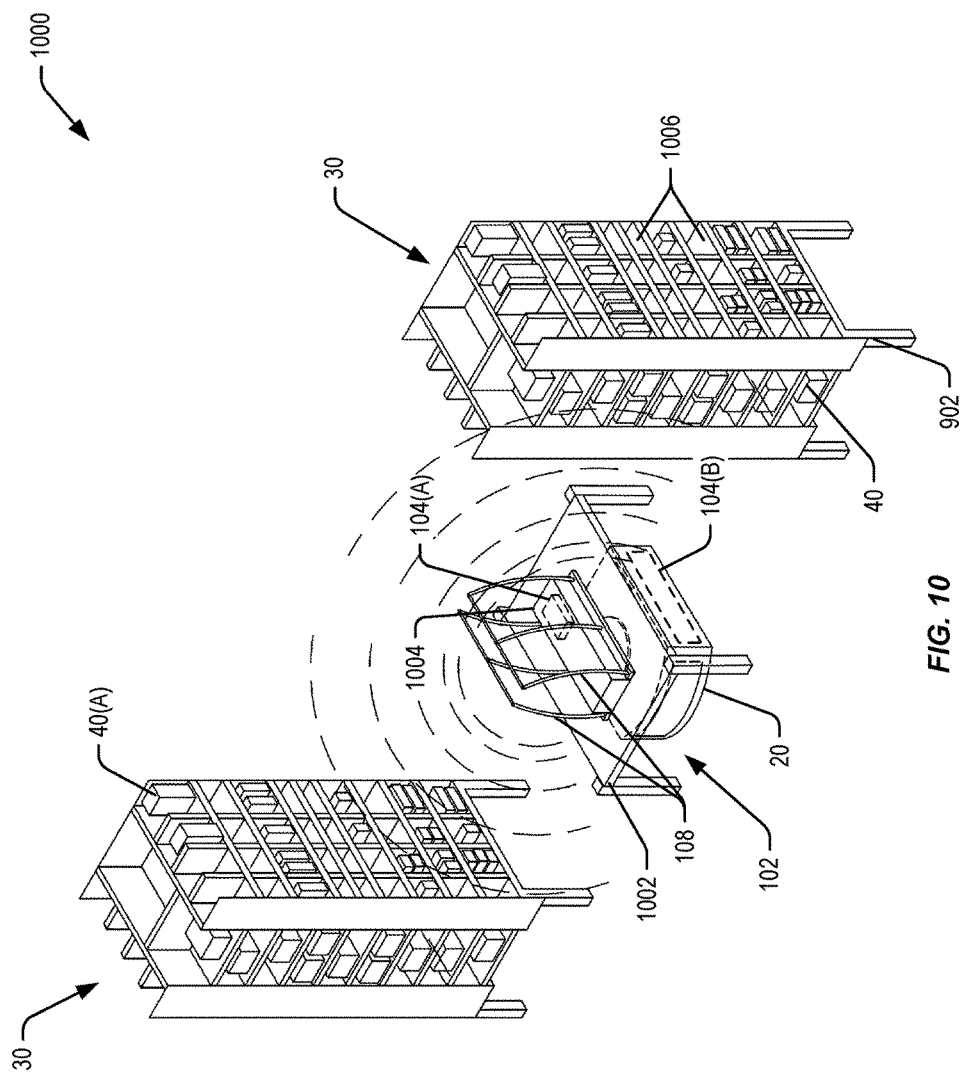

FIG. 10 illustrates an example mobile RFID reading system 1000 for implementing techniques relating to reading RFID tags as described herein. The mobile RFID reading system 1000 is an example of the mobile RFID reading system 100. The mobile RFID reading system 1000 may include the mobile reading device 102 and one or more inventory holders 30. The mobile reading device 102 may include a frame 1002 and the mobile drive unit 20. The frame may include a power supply 1004, the one or more antennas 108, and the RFID reader 104(A). The mobile reading device 102 may be considered a self-contained mobile reading device because the mobile reading device 102 includes sufficient components (e.g., the frame 1002, the antennas 108, the power supply 1004, and the RFID reader 104(A)) to read the RFID tags 112 associated with the inventory items 40 stowed within compartments 1006. The mobile RFID reading system 1000 may be implemented using techniques described herein to read RFID tags 112 associated with the inventory items 40 stowed in the many different inventory holders 30. Such reading may be desirable in order to identify a large amount of inventory within the inventory system 10.

In some examples, the mobile drive unit 20 includes the RFID reader 104(B). Such a configuration may enable the mobile drive unit 20 to read the RFID tags 112 using a structure other than the one depicted in this figure. For example, the mobile drive unit 20 in this figure may also be used in connection with the mobile RFID reading system 900. In some examples, the RFID reader 104(A) may be configured to read, via the antennas 108, the inventory items 40 stowed within the compartments 1006 at the top of the inventory holders 30. For example, the inventory item 40(A).

The inventory holders 30 are illustrated as including a plurality of compartments 1006 and inventory items 40 stowed in some of the plurality of compartments 1006. The inventory holders 30 may be constructed of any suitable material that may be permeable by RF energy. For example, the inventory holder 30 may be constructed of fabric, plastic, cardboard, webbing and the like. In some examples, the inventory holder 30 may include the frame 902, which may not be permeable by the RF energy and which may include one or more elongated members 904(A)-904(D)) with fabric, plastic, webbing, or cardboard attached to the frame 902. In this manner, the RF energy may be unobstructed as it moves between the compartments 1006 to read the RFID tags 112 attached to the inventory items 40. In some examples, the fabric, plastic, webbing, or cardboard may have disposed therein or attached thereto one or more antennas 108. These may be sewn into the fabric, attached to the cardboard, and the like. In some examples, the frame 902 may be constructed of metal or some other rigid material. The inventory holder 30 may have a rectangular or cubicle shape. In some examples, the inventory holder 30 may have a cylindrical, triangular, trapezoidal, or any other suitable shape.

Figure 11:
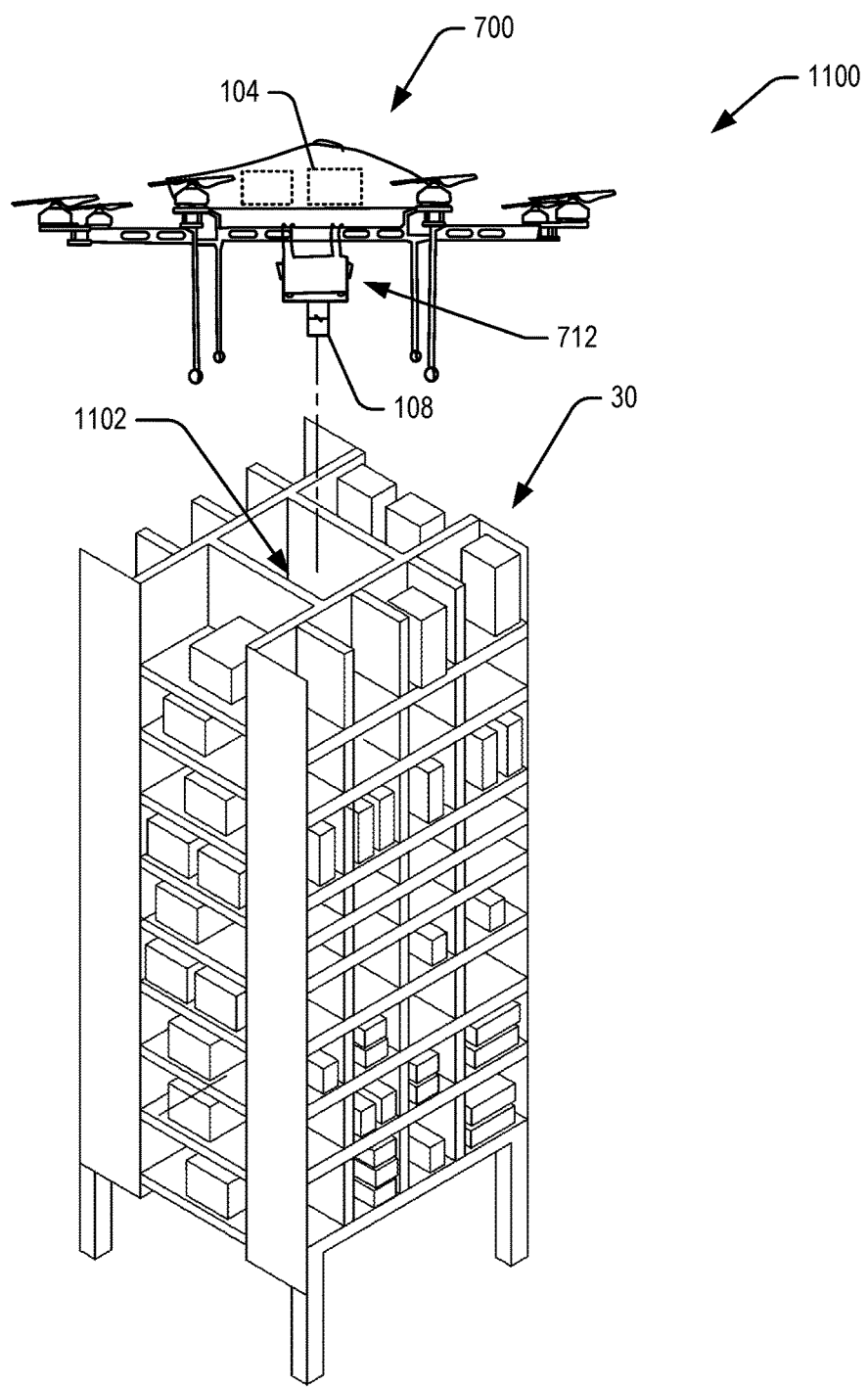

FIG. 11 illustrates an example mobile RFID reading system 1100 for implementing techniques relating to reading RFID tags as described herein. The mobile RFID reading system 1100 is an example of the mobile RFID reading system 100. The mobile RFID reading system 1100 may include the UAV 700 and one or more inventory holders 30. The UAV 700 may include the RFID reader 104 and one or more antennas 108. The RFID reader 104 may be configured to read, via the one or more antennas 108, the RFID tags 112. As the one or more antennas 108 may be deployable, the RFID reader 104 may be configured to read, via the one or more antennas 108 in a deployed state. In some examples, the one or more antennas 108 may be deployed within a reading channel 1102 within the inventory holder 30. The reading channel 1102 may be sized to receive the one or more antennas 108 when in the deployed state. In some examples, more than one reading channel 1102 is provided within the inventory holder 30. In some examples, the reading channel 1102 may be located on one of the sides of the inventory holder 30. In this manner, the UAV 700 or other reading device (e.g., the mobile RFID reading system 1000) may be configured to read the RFID tags 112 from other locations. In some examples, the antenna management system 712 may be configured to deploy a plurality of antennas 108. For example, the plurality of antennas 108 may be included within a plurality of flexible members. In some examples, the plurality of antennas 108 are arranged in a curtain of antennas that may be lowered over the inventory holder 30 while the RFID tags 112 are read.

In some examples, the UAV 700 may hover above the inventory holder 30 and read the RFID tags 112 with the one or more antennas 108 in an un-deployed state. The UAV 700 may then deploy the antennas 108 within the reading channel 1102 and read the RFID tags 112. Next, the UAV 700 may move to another position closer to a top surface of the inventory holder 30 and read others of the RFID tags 112. In some examples, the UAV 700 may be configured to land on the top surface of the inventory holder 30 as part of reading the RFID tags 112. Whether after landing on the top surface of the inventory holder 30 or otherwise (e.g., while hovering near the inventory holder 30), a first electromechanical interface of the UAV 700 may be configured to couple with a second electromechanical interface of the inventory holder 30 as described herein. The coupling of the first electromechanical interface with the second electromechanical interface may enable the frame 902 (FIG. 9) of the inventory holder 30 and/or the one or more elongated members 904(A)-904(D) (FIG. 9) of the inventory holder 30 to function as antennas as described herein. In this manner, the RFID reader 104 onboard the UAV 700 may read, via the frame 902 and/or the one or more elongated members 904(A)-904(D), the RFID tags 112. In some examples, the coupling may enable the RFID reader 104 onboard the UAV 700 to read, via the antennas 906(A)-906(D) (FIG. 9) mounted within the inventory holder 30 or other antennas independent of the UAV 700 (e.g., antennas associated with an embodiment of the inventory structure 114 that is stationary), the RFID tags 112.

In some examples, the UAV 700 may navigate above and around the inventory holder 30. In some examples, the UAV 700 may navigate above many inventory holders 30 and read the RFID tags 112 of the inventory items 40 stowed in the many inventory holders 30.

Figure 12:
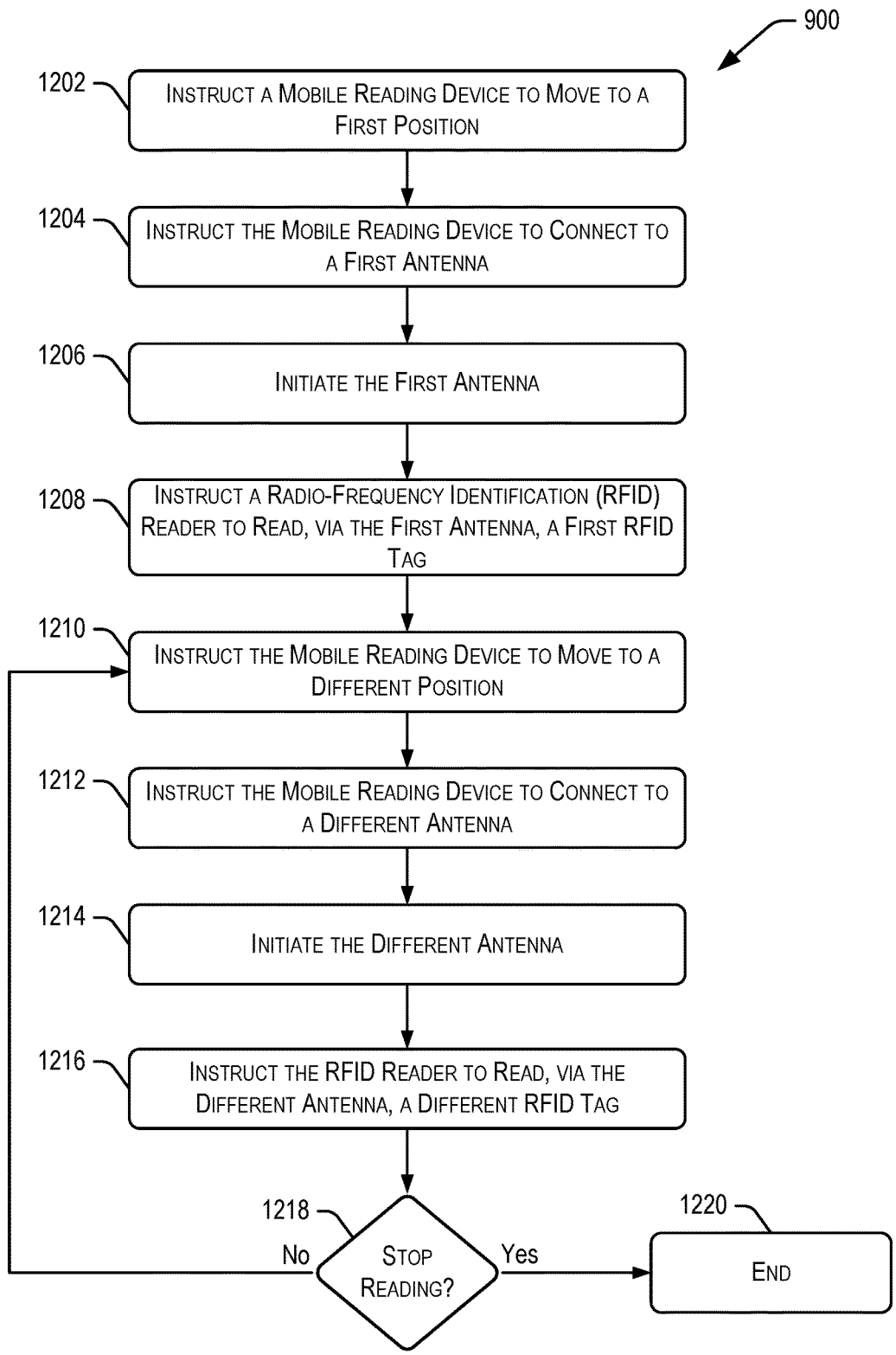
FIG. 12 illustrates a flow diagram depicting example acts for implementing techniques relating to reading RFID tags as described herein, according to at least one embodiment.

FIG. 12 depicts process 1200 including example acts and/or procedures relating to reading RFID tags in accordance with at least one example. Some or all of the process 1200 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Components of the architecture 800 (e.g., the reader system 802, the management module 15 and/or the UAV management module 702) may perform the process 1200 of FIG. 12. The process 1200 begins at 1202 by instructing a mobile reading device to move to a first position. In some examples, instructing the mobile reading device to move to a first position may include instructing an autonomous movement device to move the mobile reading device to the first position. The first position may be adjacent to one or more inventory structures. The autonomous movement device may be a mobile drive unit or a UAV and the mobile reading device may include an RFID reader and a power supply.

At 1204, the process 1200 instructs the mobile reading device to connect to a first antenna. In some examples, the first antenna is attached to or near one or more inventory structures. For example, when the inventory structure is a row of inventory holders held within a framework, the first antenna may be one or more antennas that are attached to the framework and are used to read RFID tags associated with inventory items held within the inventory holders in the row. In some examples, the first antenna is a portion of the inventory structure as discussed herein. The mobile reading device may include a first interface for connecting the RFID reader to the antenna (e.g., an antenna or the structure). The antenna and/or structure may include a second interface that may be complimentary to the first interface. For example, the first interface may be a plug and the second interface may be a socket. The plug and the socket may join to create a coupled structure. Through this coupled structure RF energy may flow away from and towards the RFID reader.

In some examples, the first interface may include one or more metal contacts extending away from the mobile reading device (e.g., forming a "U" shape turned on its side). The complimentary second interface of the structure and/or antenna may be a flat piece of metal that extends lengthwise down the row of inventory holders. The second interface may be sized to receive the first interface (e.g., with the flat piece of metal being within the U-shaped interface). The first interface and/or the second interface may include one or more magnets to hold the first interface to the second interface. Such an arrangement may enable the mobile reading device to maintain contact with the antenna and/or structure while also moving along the structure and reading RFID tags. In this manner, the mobile reading device may be configured to read tags from multiple locations while moving.

In some examples, instructing the mobile reading device to connect to the first antenna may include instructing the mobile reading device to connect to an antenna associated with a set of stowage lockers and/or the stowage locker itself functioning as an antenna. The set of stowage lockers may be a location within a warehouse or building that includes an inventory system where certain items are stored. These items may be tagged with a unique RFID tag and stowed in one or more lockers of the set of stowage lockers. Using techniques described herein, the items within the set of stowage lockers may be identified by the mobile reading device. In some examples, the items that may be stowed in the set of stowage lockers include, for example, hard hats, safety glasses, cones, parts, tools, computers, laptops, hand-held readers, inventory bins, totes, and the like or any other inventory items.

In some examples, instructing the mobile reading device to connect to the first antenna may include instructing the mobile reading device to connect to an antenna that is attached to the mobile reading device. In some examples, when the first antenna is connected to the mobile reading device, the mobile reading device may be configured to move about a warehouse and read RFID tags without first stopping to connect to other antennas that are not attached to the mobile reading device. In some examples, instructing the mobile reading device to connect to the first antenna may include instructing the mobile reading device to connect to one or more elongated members of an inventory holder to cause the one or more elongated members to function as antennas. As described herein, this may include connecting the inventory holder and the mobile reading device (e.g., the RFID reader) together using two or more corresponding interfaces.

At 1206, the process 1200 initiates the first antenna. In some examples, this may include sending a signal to the first antenna instructing it to begin to transmit RF energy and receive RF energy.

At 1208, the process 1200 instructs an RFID reader to read, via the first antenna, a first RFID tag. In some examples, instructing the RFID reader to read may include sending a signal to the RFID reader instructing it to turn on or begin reading (i.e., scanning for RFID tags). In some examples, the RFID reader may be configured to read via the first antenna and other antennas to which it is connected. In this manner, the RFID reader may be configured to read multiple RFID tags stowed in different locations using multiple antennas. In some examples, the process 1200 instructs the RFID reader to read after the mobile reading device connects to the first antenna.

At 1210, the process 1200 instructs the mobile reading device to move to a different position. In some examples, this may include the mobile reading device moving to a different position relative to the inventory structure discussed above. In some examples, moving to a different position may include decoupling from a first inventory holder, moving to a second inventory holder, and coupling to the second inventory holder. In some examples, the second position includes a different type of inventory structure from the inventory structure associated with the first position. For example, the first position may be adjacent to a row of inventory holders, and the different position may include being detachably coupled to an inventory holder. In some examples, the same mobile reading device that reads the row of inventory holders may also read the coupled inventory holder.

At 1212, the process 1200 instructs the mobile reading device to connect to a different antenna. In some examples, the different antenna may be located at the different position. In this manner, the mobile reading device may connect to varying antennas located at different positions. In some examples, connecting to the different antenna may be performed in a manner as similarly discussed herein or in a different manner. At 1214, the process 1200 initiates the different antenna. In some examples, initiating the different antenna may be performed in a manner as similarly discussed herein or in a different manner.

At 1216, the process 1200 instructs the RFID reader to read, via the different antenna, a different RFID tag. In some examples, instructing the RFID reader to read may include sending a signal to the RFID reader instructing it to turn on or begin reading (i.e., scanning for RFID tags). In some examples, the RFID reader may be configured to read via the different antenna and other antennas to which it is connected. In this manner, the RFID reader may be configured to read multiple RFID tags stowed in different locations. In some examples, the process 1200 instructs the RFID reader to read after the mobile reading device connects to the different antenna.

At 1218, the process 1200 determines whether to stop reading. In some examples, determining whether to stop reading may be done in accordance with a confidence threshold. For example, the confidence threshold may indicate when the collecting of radio frequency responses should stop. In some examples, the confidence threshold may indicate a confidence level or confidence range. The confidence threshold may therefore indicate how confident the RFID reader is that it has identified all of possible inventory items at the different location and/or that are suggested within its reading routine. The possible inventory items may be identified from a manifest that indicates inventory items expected to be stowed at the different locations and throughout the warehouse. A confidence level of 100% may indicate that every inventory item from the manifest was identified as being at the different position and/or within the warehouse (i.e., at the first position and the different position). In the same vein, if the manifest indicates that 100 inventory items should be stowed at the different position (e.g., within an inventory holder), and 85 inventory items are identified (by reading 85 tags), the confidence level may be 85%. In some examples, the confidence level and/or confidence threshold may correspond to a fall-off curve. For example, as a read time increases (i.e., the total time that a reader is interrogating tags), the number of identified tags over time may increase, level off, then begin to fall. Thus, even though the RFID reader may continue to interrogate tags, the fall-off curve may indicate that it is going to take too much time (according to some standard) to identify any more tags. Thus, the RFID reader may be instructed to stop interrogating tags. In some examples, the confidence level may increase each time the RFID reader reads RFID tags. If the answer at 1218 is yes, then the process 1200 ends at 1220. If the answer at 1218 is no, then the process 1200 returns to 1210 and instructs the mobile reading device to move to a different position and acts 1212-1218 are repeated. In this manner, the mobile reading device may read RFID tags at many different locations.

Figure 13:
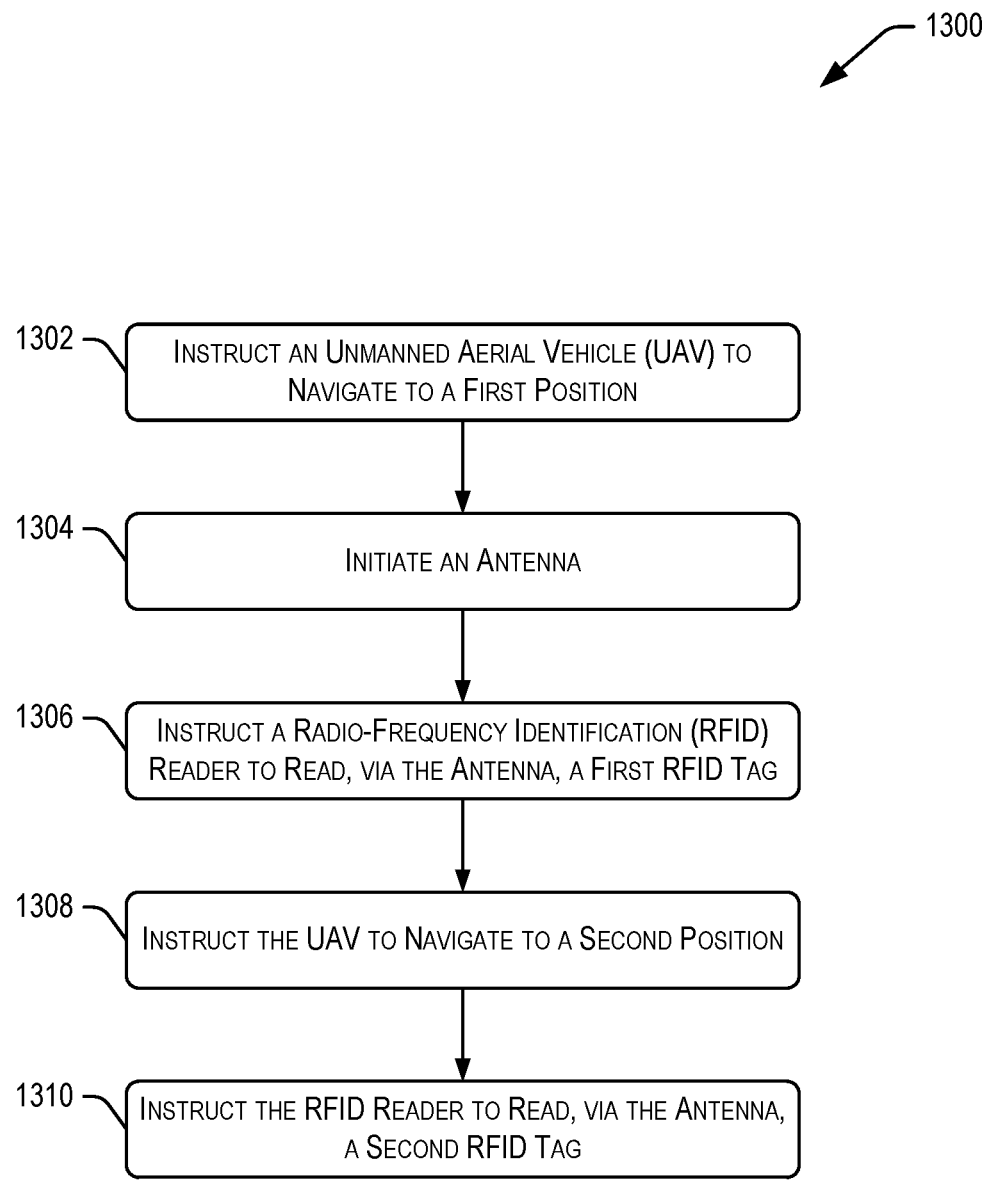
FIG. 13 illustrates a flow diagram depicting example acts for implementing techniques relating to reading RFID tags as described herein, according to at least one embodiment.

FIG. 13 depicts process 1300 including example acts and/or procedures relating to reading RFID tags in accordance with at least one example. Components of the architecture 800 (e.g., the reader system 802, the management module 15 and/or the UAV management module 702) may perform the process 1300 of FIG. 13. The process 1300 begins at 1302 by instructing an unmanned-aerial vehicle (UAV) to navigate to a first position. In some examples, instructing the UAV to navigate to a first position may include instructing the UAV to fly to the first position. In some examples, the UAV may include an RFID reader, a power supply, and one or more antennas. The first position may be located above an inventory structure. For example, the first position may be a location within a warehouse above an inventory holder that includes inventory items tagged with RFID tags. In some examples, the first position may include a top surface of the inventory structure on which the UAV may land.

At 1304, the process 1300 initiates an antenna. Initiating the antenna may involve instructing a subsystem of the UAV to deploy the antenna. Deploying the antenna may involve releasing, dropping, unspooling, lowering, or extending the antenna. Such deployment may enable the antenna to obtain more precise reads with less disruption to the inventory system. This may be because the deployable antenna may be placed near an inventory structure while the UAV is located high above the inventory structure. Deploying the antenna may also involve deploying the antenna within a reading channel of the inventory structure.

At 1306, the process 1300 instructs an RFID reader to read, via the antenna, a first RFID tag. Instructing the RFID reader to read may include sending a turn on signal to the RFID reader. In some examples, the RFID reader is configured to read the first RFID tag when the antenna is in a deployed state and/or when the antenna (or other antennas) are not deployed. Instructing the RFID reader to read may involve reading, via the deployed antenna within the reading channel. The first RFID tag may be stowed in the inventory structure.

At 1308, the process 1300 instructs the UAV to navigate to a second position. In some examples, navigating to the second position may involve flying the UAV to a location nearer to the inventory structure than the first position. In some examples, at the second position, the antenna is extended even further within the reading channel. In some examples, the second position is a different inventory structure.

At 1310, the process 1300 instructs an RFID reader to read, via the antenna, a second RFID tag. In some examples, the RFID reader is configured to read when the antenna is in a deployed state and/or when the antenna (or other antennas) are not deployed. Instructing the RFID reader to read may involve reading, via the deployed antenna within the reading channel. Thus, the second RFID tag may read at the second position.

Figure 14:
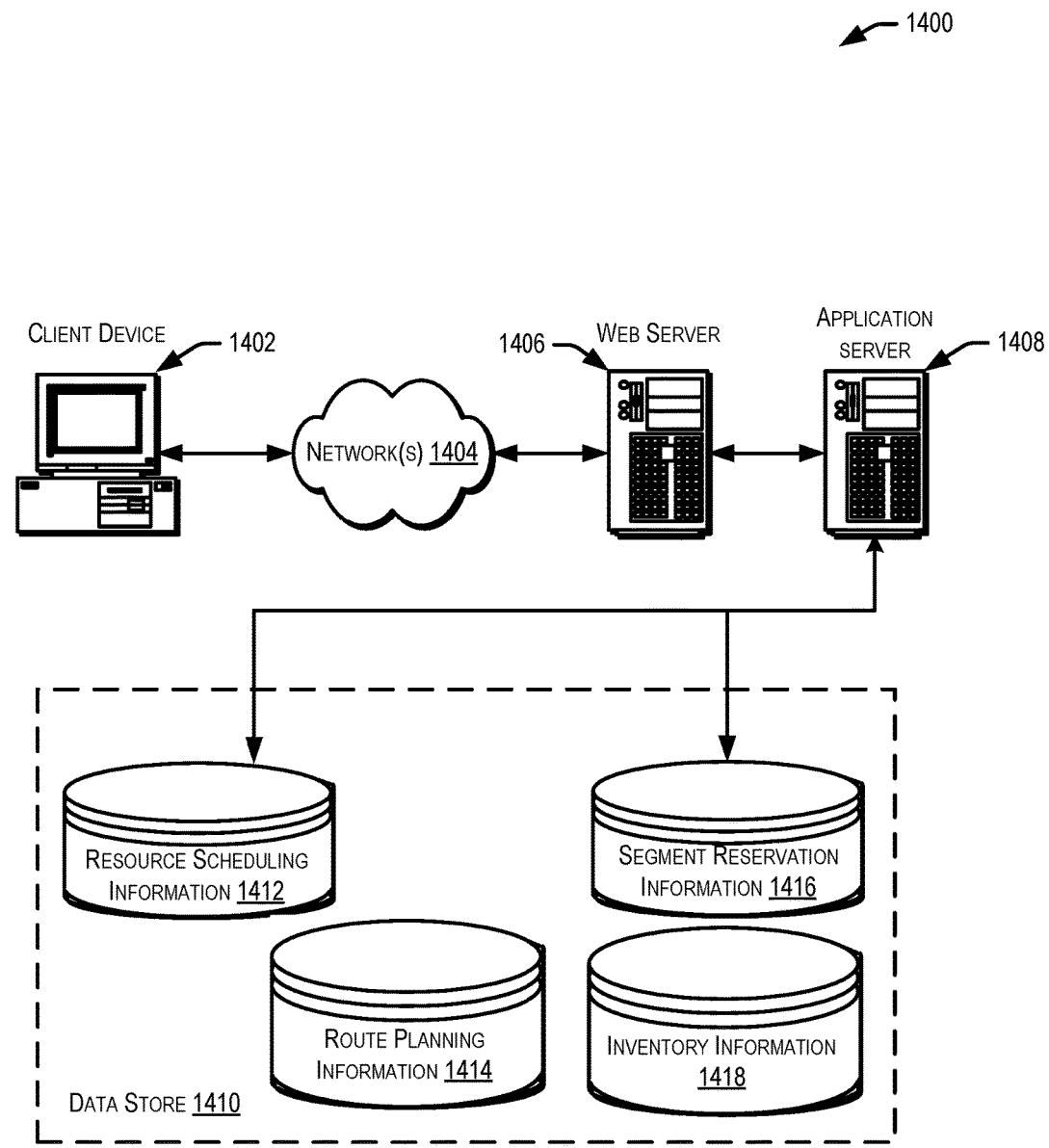
FIG. 14 illustrates an environment in which various features of the inventory system can be implemented, according to at least one embodiment.

FIG. 14 illustrates aspects of an example environment 1400 for implementing aspects in accordance with various embodiments. As will be appreciated, although a Web-based environment is used for purposes of explanation, different environments may be used, as appropriate, to implement various embodiments. The environment includes an electronic client device 1402, which can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1402 and the application server 1408, can be handled by the Web server. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing information which can be used by modules described herein, such as resource scheduling information 1412, route planning information 1414, segment reservation information 1416, and/or inventory information 1418. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the description herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the description.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the description and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the description as set forth in the claims.

Other variations are within the spirit of the present description. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this description are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
   a mobile drive unit comprising:
      a reader device; and
      a first interface in communication with the reader device; and
   a holder structure comprising:
      a frame including one or more elongated members;
      one or more compartments configured to receive items, the one or more elongated members configured to at least provide structural support to the one or more compartments of the holder structure; and
      a second interface in communication with the frame and configured to mechanically couple with the first interface to create a coupled structure, the reader device configured to read, through the coupled structure with an elongated member of the one or more elongated members being an antenna for the reader device, an identification tag associated with an item stowed in a compartment of the one or more compartments of the holder structure.

2. The system of claim 1, wherein the elongated member is configured to receive electrical signals from the reader device through the coupled structure and to collect identifying information from the identification tag.

3. The system of claim 1, wherein prior to creating the coupled structure, the antenna is in a dormant state, and after creating the coupled structure, the antenna is in an active state.

4. The system of claim 1, wherein:
   the holder structure further comprises a separate antenna attached to the elongated member of a second elongated member of the one or more elongated members; and
   reading through the coupled structure with the elongated member being the antenna for the reader device comprises reading through the coupled structure with the separate antenna being the antenna for the reader device.

5. The system of claim 1, wherein the elongated member is configured to produce a reading field directed toward a central portion of the holder structure when the elongated member is the antenna.

6. A computer-implemented method, comprising:
   instructing a movement device of a mobile reading device to move to a first position, the mobile reading device comprising:
      the movement device;
      a frame;
      a reader device supported by the frame; and
      an antenna supported by the frame;
   instructing the movement device to couple with the frame, wherein coupling the movement device with the frame forms an electrical connection between the movement device and the reader device;
   instructing the reader device to read, via the antenna, a first identification tag associated with a first item held at the first position or a second position, each of the first position and the second position independent of the mobile reading device; and
   instructing the reader device to read a second identification tag associated with a second item, the second item held at the second position or a third position.

7. The computer-implemented method of claim 6, wherein instructing the movement device to couple with the frame comprises instructing the movement device to lift the frame.

8. The computer-implemented method of claim 6, wherein coupling the movement device with the frame comprises physically coupling a first interface of the movement device to a second interface of the frame to form the electrical connection.

9. The computer-implemented method of claim 8, wherein the first item is held in an inventory holder, a row of inventory holders, or a set of stowage lockers.

10. The computer-implemented method of claim 6, wherein:
    the first item is held in a compartment of an inventory holder and
    the reader device is configured to receive power from the movement device through the electrical connection to read the first identification tag associated with the first item.

11. The computer-implemented method of claim 6, further comprising:
    instructing the movement device to couple with a second frame supporting a second reader device and a second antenna;
    instructing the second reader device to read, via the second antenna, a third identifying tag to identify a third item;
    instructing the movement device move the second frame to a fourth position; and
    instructing the second reader device to read, via the second antenna, a fourth identifying tag to identify a fourth item while at the fourth position.

12. The computer-implemented method of claim 11, wherein:
    the third item is held in a first holder structure; and
    the fourth item is held in a second holder structure.

13. The computer-implemented method of claim 6, wherein the movement device further comprises a power supply.

14. The computer-implemented method of claim 13, wherein coupling the movement device with the frame forms the electrical connection between the power supply of the movement device and the reader device.

15. The computer-implemented method of claim 6, further comprising:
    instructing the movement device to decouple from the frame;
    instructing the movement device to couple with a holder structure; and
    instructing the movement device to transport the holder structure to a fourth position.

16. A system, comprising:
    a drive unit comprising:
       a drive unit frame;
       a drive module attached to the drive unit frame, the drive module comprising a pair of motorized wheels configured to propel the drive unit; and
       a power supply configured to provide power to the drive module; and
    a moveable reading structure configured to detachably couple to the drive unit by a set of interfaces and to be physically supported by the set of interfaces, the moveable reading structure comprising:
       an antenna; and
       a reader device configured to at least:
          receive power from the power supply of the drive unit by the set of interfaces; and
          read identifying tags through the antenna.

17. The system of claim 16, wherein the drive unit and the moveable reading structure are separate from each other.

18. The system of claim 16, wherein:
   the drive unit further comprises a first interface of the set of interfaces;
   the moveable reading structure further comprises a second interface of the set of interfaces, the second interface configured to physically couple with the first interface to form a coupled structure; and
   receiving the power from the power supply of the drive unit by the set of interfaces comprises receiving electrical signals by the coupled structure.

19. The system of claim 16, wherein:
   the moveable reading structure is a first moveable reading structure, the antenna is a first antenna, and the reader device is a first reader device; and
   the system further comprises a second moveable reading structure that comprises:
     a second antenna;
     a second reader device configured to at least:
       receive power from the power supply; and
       read other identifying tags through the second antenna.

20. The system of claim 16, wherein the drive unit further comprises a control module that is configured to process instructions for:
   detachably coupling the drive unit to the moveable reading structure; and
   instructing the reader device to read the identifying tags through the antenna.

* * * * *